United States Patent
Wang et al.

(10) Patent No.: US 11,516,395 B2
(45) Date of Patent: Nov. 29, 2022

(54) ELECTRONIC APPARATUS WITH IMAGE STABILIZATION

(71) Applicant: MEDIATEK INC., Hsinchu (TW)

(72) Inventors: Shao-Yang Wang, Taichung (TW); Ying-Jui Chen, Zhubei (TW); Keh-Tsong Li, Kaohsiung (TW)

(73) Assignee: MEDIATEK INC., Hsinchu (TW)

( * ) Notice: Subject to any disclaimer, the term of this patent is extended or adjusted under 35 U.S.C. 154(b) by 142 days.

(21) Appl. No.: 16/508,492

(22) Filed: Jul. 11, 2019

(65) Prior Publication Data

US 2021/0014421 A1 Jan. 14, 2021

(51) Int. Cl.
*H04N 5/232* (2006.01)
*G06F 3/041* (2006.01)
*G02B 27/64* (2006.01)

(52) U.S. Cl.
CPC ....... *H04N 5/23267* (2013.01); *G02B 27/646* (2013.01); *G06F 3/0418* (2013.01); *H04N 5/23254* (2013.01); *H04N 5/23293* (2013.01)

(58) Field of Classification Search
CPC ........... H04N 5/23267; H04N 5/23293; H04N 5/23254; H04N 5/23264; H04N 5/23251; G06F 3/0418; G02B 27/646
See application file for complete search history.

(56) References Cited

U.S. PATENT DOCUMENTS

| | | | |
|---|---|---|---|
| 8,610,663 B2 | 12/2013 | Kim et al. | |
| 8,624,938 B2 | 1/2014 | Kimura | |
| 9,100,575 B2* | 8/2015 | Lee | H04N 5/23254 |
| 2012/0127368 A1 | 5/2012 | Jak et al. | |

(Continued)

FOREIGN PATENT DOCUMENTS

| | | |
|---|---|---|
| CN | 101625844 A | 1/2010 |
| CN | 102375713 A | 3/2012 |
| CN | 103123780 A | 5/2013 |

(Continued)

OTHER PUBLICATIONS

CN 204857151 English Translation (Year: 2015).*

(Continued)

*Primary Examiner* — Twyler L Haskins
*Assistant Examiner* — Angel L Garces-Rivera
(74) *Attorney, Agent, or Firm* — McClure, Qualey & Rodack, LLP

(57) ABSTRACT

An electronic apparatus is provided. The electronic apparatus includes a display device, a sensor, and a processor. The display device receives an image data. The display device includes a display panel and displays an image related to the image data on the display panel. A reference image point of the image is displayed on a first location on the display panel. The sensor detects a movement status of the electronic apparatus when the electronic apparatus shakes to generate at least one movement parameter. The processor calculates compensation data according to the at least one movement parameter and size information of the display panel. When the display device receives the compensation data, the display device displays the image by shifting the reference image point of the image from the first location to a second location on the display panel to display according to the compensation data.

18 Claims, 4 Drawing Sheets

(56) References Cited

U.S. PATENT DOCUMENTS

2016/0291638 A1  10/2016  Fu et al.

FOREIGN PATENT DOCUMENTS

| CN | 204857151 U | 12/2015 |
| CN | 106126006 A | 11/2016 |

OTHER PUBLICATIONS

Chinese language office action dated Nov. 27, 2020, issued in application No. TW 109114307.
Chinese language office action dated Apr. 2, 2021, issued in application No. CN 202010236209.3.

\* cited by examiner

ELECTRONIC APPARATUS WITH IMAGE STABILIZATION

BACKGROUND OF THE INVENTION

Field of the Invention

The invention relates to an electronic apparatus, and more particularly, to an electronic apparatus with image stabilization.

Description of the Related Art

An electronic apparatus with an image display function is widely used in human life. In particular, a mobile electronic apparatus is more commonly used by modern people, for example, a smart phone, a smart watch, a digital camera, an automotive displayer, a satellite navigation device, and any electronic apparatus with a displayer. However, as shown in FIG. 1, when the electronic apparatus or the object carrying the electronic apparatus moves suddenly, its display panel 1 may shake in response to the movement. Due to the persistence of vision of the eyes of the human eyes, when the user stares at the displayer, the user see unclear scenes which are formed by a lot of images displayed on the shaking display panel 1.

BRIEF SUMMARY OF THE INVENTION

An exemplary embodiment of an electronic apparatus is provided. The electronic apparatus receives an image data related to an image and comprises a display device, a sensor, and a processor. The display device comprises a display panel which displays the image. The display panel comprises a plurality of pixels arranged in an array. The sensor detects a movement status of the electronic apparatus when the electronic apparatus shakes to generate at least one movement parameter. The processor receives the least one movement parameter and calculates compensation data according to the at least one movement parameter and size information of the display panel to indicate a location of a reference image point of the image on the display panel. The display device receives the image data and the compensation data and generates display data according to the image data and the compensation data. The display device displays the image according to the display data.

An exemplary embodiment of an electronic apparatus is provided. The electronic apparatus comprises a display device, a sensor, and a processor. The display device comprises a display panel and receives an image data. The display device displays an image related to the image data on the display panel. A reference image point of the image is displayed on a first location on the display panel. The sensor detects a movement status of the electronic apparatus when the electronic apparatus shakes to generate at least one movement parameter. The processor receives the least one movement parameter and calculates compensation data according to the at least one movement parameter and size information of the display panel. When the display device receives the compensation data, the display device displays the image by shifting the reference image point of the image from the first location to a second location on the display panel to display according to the compensation data.

In an exemplary embodiment, the display device further comprises a controller, a timing controller, a scan driver, and a data driver. The controller receives the image data and maps a reference image element which is obtained from the image data to the first location. Then, the controller generates display data according to the mapping and further generates a timing control signal. The reference image point of the image corresponds to the reference image element. The timing controller is controlled by the timing control signal to generate a first timing signal and a second timing signal. The scan driver receives the first timing signal and generates driving signals to the display panel according to the first timing signal to drive the plurality of pixels. The data driver receives the display data and the second timing signal, generates image signals according to the display data, and provides the image signals to the driven pixels according to the second timing signal. The display panel is controlled by the scan driver and the data driver to display the image. When the controller receives the compensation data, the controller re-maps the reference image element of the image data to the second location instead of the first location according to the compensation data and modifies the display data according to the re-mapping. The data driver generates the image signals according to the modified display data, so that the display panel displays the image by using the second location to display the reference image point of the image instead of the first location.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
FIG. 1 is a schematic view showing the images seen by the human eyes on a display panel when the display panel shakes.
Figure 2:
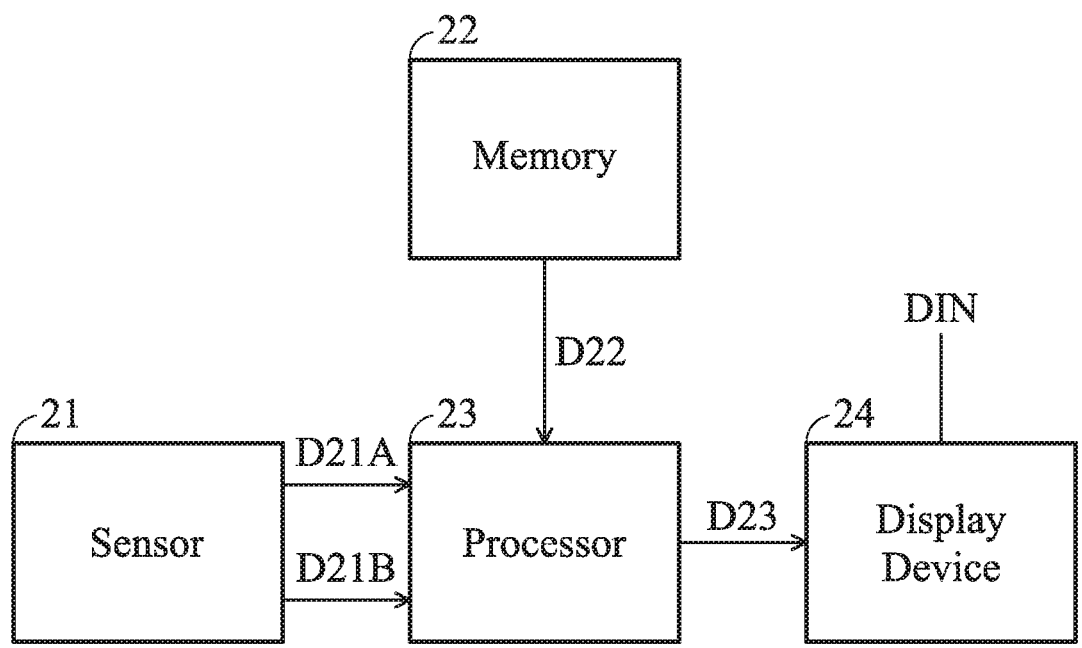
FIG. 2 show an exemplary embodiment of an electronic apparatus with image stabilization.
Figure 3:
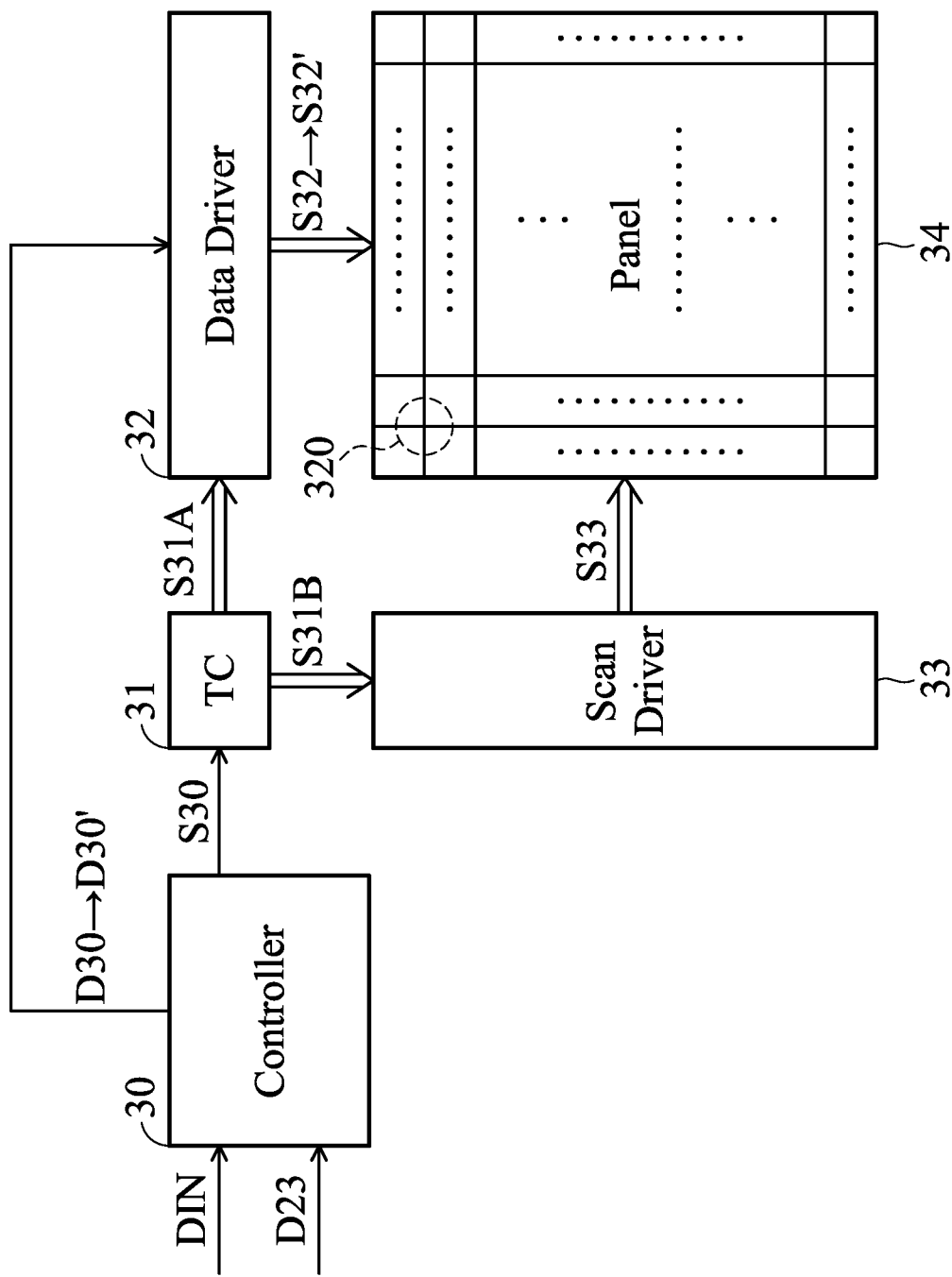
FIG. 3 shows an exemplary embodiment of a display device of the electronic apparatus in FIG. 2.

FIG. 2 shows an exemplary embodiment of an electronic apparatus with image stabilization. Referring to FIG. 2, an electronic apparatus 2 comprises a sensor 21, a memory 22, a processor 23, and a display device 24. The electronic apparatus 2 is a mobile apparatus. In the embodiment, the electronic apparatus 2 may be a mobile phone, an automotive displayer (such as head up displayer), a tablet, a smart watch, or a mobile electronic apparatus with a displayer. The display device 24 may be a liquid crystal display device, an LED (light-emitting diode) display device, an OLED (organic light-emitting diode) display device, or any display device which can display images according to image data DIN. In an embodiment, as shown in FIG. 3, the display device 24 comprises a controller 30, a timing controller (TC) 31, a data driver 32, a scan driver 33, and a display panel 34. The display panel 34 comprises a plurality of pixels 320 which are arranged on rows and columns to form an array. The controller 30 receives the image data DIN and generates display data D30 and a timing control signal S30 according to the content of the image data DIN and the display parameters of the display panel 34. The display parameters may comprise the resolution, the dot pitch, the scan frequency, the refresh rate, the color parameters, brightness parameter, and so on. In order to show an image related to the image data DIN on the display panel 34, the controller 30 processes the image data DIN according to the image data DIN and the display para333meters to obtain a plurality of image elements and further determines corresponding locations on the display panel 34 where the image elements are shown respectively. In other words, the controller 30 maps each of the image elements to one location on the display panel 34 and generates the display data D30 and the timing control signal S30 according to the result of the mapping. In the embodiment, a location on the display panel 34 corresponds to one pixel or several adjacent pixels.

The controller 30 provides the timing control signal S30 to the timing controller 31. The timing controller 31 is controlled by the timing control signal S30 to generate timing signals S3 1A and S31B for the data driver 32 and the scan driver 33 respectively. The scan driver 33 receives the timing signal S31B and generates driving signals S32 to drive the pixels 320 according to the timing signal S31B. In an embodiment, each driving signal S33 is enabled to drive the pixels arrange on one row at the same time, and the driving signals S33 are enabled successively. The data driver 33 receives the display data D30 from the controller 30 and generates image signals S32 according to the display data D30. The data driver 33 further receives the timing control signal S31A and provides the image signals S32 to the driven pixels 320 on the timing indicated by the timing control signal S31A. According to the control of the data driver 32 and the scan driver 33, the display panel 34 can display the image related to the image data DIN through the pixels 320. In an embodiment, the controller 30 may be an image composer, a Surface Flinger, an image overlay processor, a graphics processing unit (GPU), or a scaler. In another embodiment, the controller 30 and the timing controller 31 can be combines to form a timing controller which performs the operations of the controller 30 and the timing controller 31 described in the embodiments of the present invention.

For the image stabilization, when the electronic apparatus 2 shakes by a direction, the sensor 21 operates to detect the movement status of the electronic apparatus 2 to generate at least one movement parameter. The detected movement status will be applied to generate compensation data for the display device 24 to modify the display data, so that the display panel can display a new image which is related to the image data and shifted from the original image. The detail of the image stabilization using the movement status of the electronic apparatus 2 will be described in the following paragraphs.

In the embodiment, the movement status may comprise the movement direction and the movement speed of the electronic apparatus 2. The sensor 21 detects the movement direction of the electronic apparatus 2 and generates a direction parameter D21A according to the movement direction. Moreover, the sensor 21 detects the movement speed (such as an average speed) in the period when the electronic apparatus 2 shakes and calculates the movement distance of the electronic apparatus 2 according to the movement speed and the length of the period to generate a distance parameter D21B.

The memory 22 stores size information of the display panel 34 of the display panel 24. The size information may comprise the size of the display panel 34, the resolution of the display panel 34, a distance between adjacent two pixels of the display panel 34, and the number of pixels per inch on the display panel 34. The processor 23 receives the direction parameter D21A and the distance parameter D21B from the sensor 21 and further receives the size information D22 from the memory 22. In response to the shaking of the electronic apparatus 2, the processor 23 calculates compensation data D23 according to the parameters D21A and D21B and the size information D22 for the display device 34. In the compensation data D23 comprises the information about image shifting, such as the number of pixels for shifting an image or the distance on the display panel 34 for shifting an image.

Figure 4A:
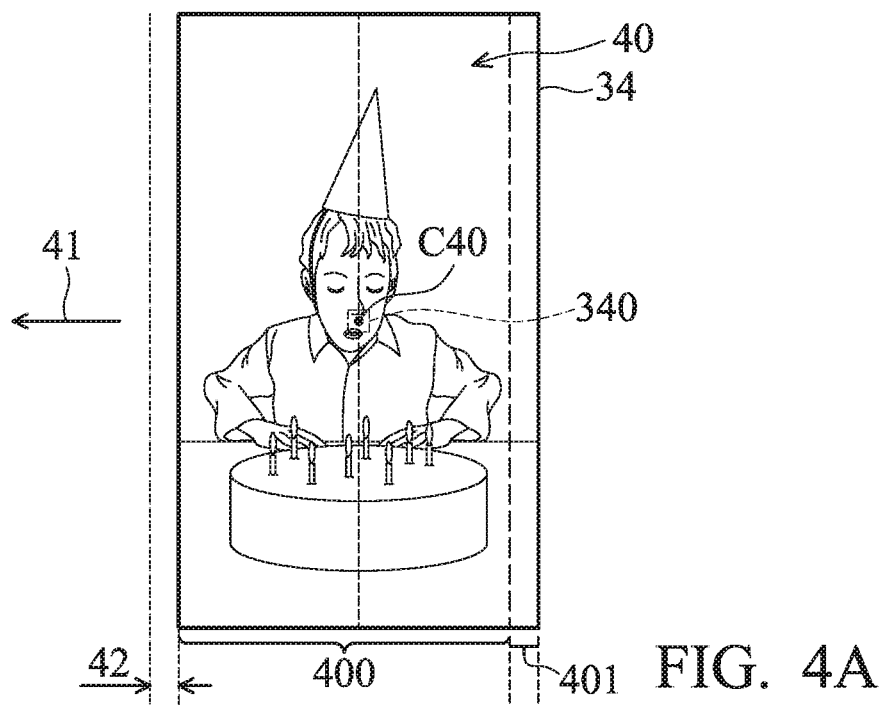
FIGS. 4A-4C is a schematic view showing movement of a display panel and shifting of an image according to an exemplary embodiment.
Figure 4B:
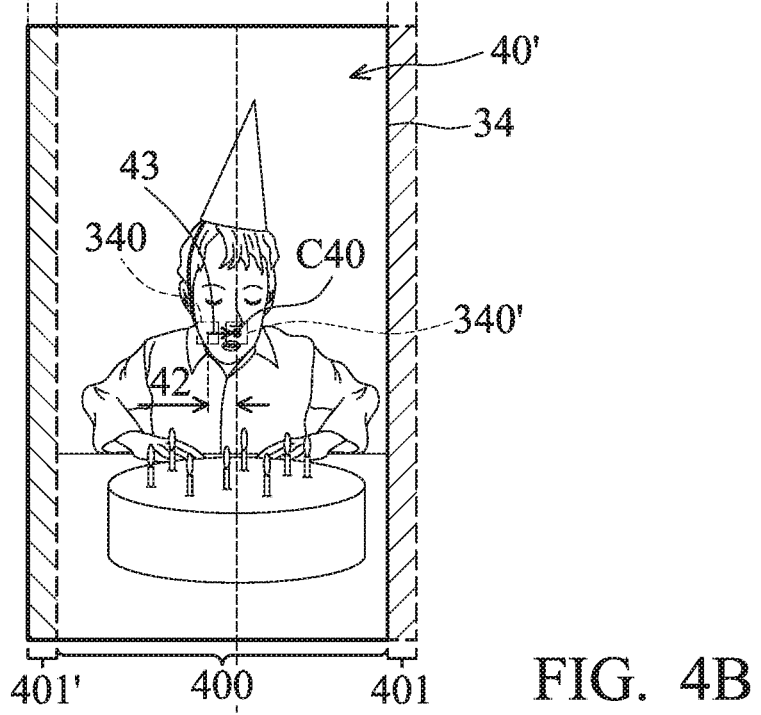

For example, as shown in FIG. 4A, the controller 30 generates the display data D30 and the timing control signal S30 according to the image data DIN and the display parameters of the display panel 34, and the display panel 34 displays an image 40 in response to the control of the display data D30 and the timing control signal S30. The controller 30 defines a reference image element among the image elements obtained from the image data DIN, and the controller 30 maps the reference image element to a location 340 on the display panel 34. Thus, a reference image point C40 of the image 40 corresponding to the reference image element is shown on the location 340. In the embodiment, the location 340 on the display panel 34 may corresponds to on one pixel or several adjacent pixels. When the electronic apparatus 2 shakes toward the direction 41 (for example, the left direction) in a period as shown in FIG. 4B, the sensor 21 detects the movement direction 41 to generate the direction parameter D21A and further calculates the movement distance 42 of the electronic apparatus 2 to generate the distance parameter D21B. As described above, the processor 23 calculates the compensation data D23 according to the parameters D21A and D21B and the size information D22. When the controller 30 of the display device 24 receives the compensation data D23, the controller 30 modifies or adjusts the display parameters and performs the mapping between the image elements obtained from the image data DIN and locations on the display panel 34 according to the modified or adjusted display parameters. As shown in FIG. 4B, the controller 30 re-maps the reference image element to another location 340' on the display panel 34 according to the compensation data D23, and thus, the reference image point C40 is displayed on the location 340'. In the embodiment, according to the information about the image shifting indicated by the compensation data D23, a portion of the image elements are not mapped to any locations on the display panel 34. For example, the image elements related to the right portion 401 of the image 40 are not mapped to any locations on the display panel 34. Thus, these image elements are omitted, in other words, the right portion 401 of the image 40 is cut off. In order to fit the size of the display panel 34, the controller 30 further generates predetermined image elements in response to the omitted image elements and maps the predetermined image elements to locations on the display panel 34. The controller 30 modifies the display data D30 according to the re-mapping result of the image elements obtained from the image data DIN and the mapping result of the predetermined image elements to generate another display data D30'. Then, the data driver 33 receives the display data D30' and generates image signals S32' according to the display data D30. The display panel 34 displays a modified image 40' in response to the control of the image signals S32' from the data driver 32 and the driving signals S33 from the scan driver 33. As shown in FIG. 4B, the locations corresponding to the predetermined image elements are on the left side of the display panel 34 to show a left portion 401' of the image 40' which is used to compensate for the cut-off right portion 401. In the embodiment, the predetermined image elements are applied to show a block or white frame. Due to the insertion of the block or white frame, the size of each of the images 40 and 40' fits the size of the size of the display panel 34.

Figure 4C:

Referring to FIGS. 4A-4C, the direction 43 by which the location 340' is shifted from the location 340 is inverse to the movement direction 41 of the electronic apparatus 2, and the movement distance between the locations 340 and 340' is equal to the movement distance 42 of the electronic apparatus 2. Thus, the direction from the user's eyes E40 to the reference image point C40 and the visual angle of the user which occur before the shaking of the electronic apparatus 2 are the same those which occur when the electronic apparatus 2 shakes. For the user's view, the image is stabilized during the shaking of the electronic apparatus 2 through the inverse compensation for the movement. Thus, according to the embodiment of the invention, even if the electronic apparatus 2 is shaking, the user can see clear images on the display panel 34.

In an embodiment, the electronic apparatus 2 is a mobile phone, and the sensor 21 comprises a Gyro meter and a G-sensor. When the electronic apparatus 2 shakes, the sensor 21 detects the movement direction and the movement speed of the electronic apparatus 2 through the Gyro meter and the G-sensor and calculates the movement distance of the electronic apparatus 2 for generating the direction parameter D21A and the distance parameter D21B. The processor 23 calculates compensation data D23 according to the parameters D21 and D21B and the number of pixels per inch on the display panel 34 (the size information of the display panel 34 stored in the memory 22).

In another embodiment, the electronic apparatus 2 is an automotive displayer, and the sensor 21 comprises a G-sensor and a GPS. When the electronic apparatus 2 shakes, the sensor 21 detects the movement direction and the movement speed of the electronic apparatus 2 through the G-sensor and the GPS and calculates the movement distance of the electronic apparatus 2 for generating the direction parameter D21A and the distance parameter D21B. The processor 23 calculates compensation data D23 according to the parameters D21 and D21B and the size and resolution of the display panel 34 (the size information of the display panel 34 stored in the memory 22).

In another embodiment, the electronic apparatus 2 is a tablet, and the sensor 21 comprises a G-sensor. When the electronic apparatus 2 shakes, the sensor 21 detects the movement direction and the movement speed of the electronic apparatus 2 through the G-sensor and calculates the movement distance of the electronic apparatus 2 for generating the direction parameter D21A and the distance parameter D21B. The processor 23 calculates compensation data D23 according to the parameters D21 and D21B and the distance between adjacent two pixels of the display panel 34 (the size information of the display panel 34 stored in the memory 22).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus receiving an image data related to an image, comprising:
    a display device comprising a display panel displaying the image, wherein the display panel comprises a plurality of pixels arranged in an array;
    a sensor detecting a movement status of the electronic apparatus when the electronic apparatus shakes to generate at least one movement parameter; and
    a processor receiving the at least one movement parameter and calculating compensation data according to the at least one movement parameter and size information of the display panel to indicate a direction for shifting a reference image point of the image on the display panel,
    wherein the display device receives the image data and the compensation data and generates display data according to the image data and the compensation data,
    wherein the display device displays the image according to the display data to maintain a user view direction toward to the reference image point of the image on the display panel; and
    wherein the display device further comprises:
    a controller receiving the image data and the compensation data, generating the display data according to the image data and the compensation data; and
    a data driver receiving the display data, generating image signals according to the display data, and providing the image signals to the display panel.

2. The electronic apparatus as claimed in claim 1, wherein the at least one movement parameter comprises a direction parameter and a distance parameter, the direction parameter indicates a movement direction of the electronic apparatus, and the movement direction is inverse to the direction for shifting the reference image point.

3. The electronic apparatus as claimed in claim 2, wherein the movement status comprises a movement speed and the movement direction of the electronic apparatus, and the sensor calculates a movement distance in a period according to the movement speed and generates the direction parameter and the distance parameter according to the movement direction and the movement distance.

4. The electronic apparatus as claimed in claim 1, wherein the size information of the display panel comprises at least one of size of the display panel, resolution of the display panel, a distance between adjacent two pixels of the display panel, and the number of pixels per inch on the display panel.

5. The electronic apparatus as claimed in claim 1, wherein the controller further generates a timing control signal, and the display device further comprises:
    a timing controller controlled by the timing control signal to generate a first timing signal and a second timing signal; and
    a scan driver receiving the first timing signal and generating driving signals to the display panel according to the first timing signal to drive the plurality of pixels;
    wherein the data driver further receives the display data and the second timing signal and provides the image signals to the driven pixels according to the second timing signal so that the display panel displays the image.

6. The electronic apparatus as claimed in claim 5, wherein the controller is an image composer, a Surface Flinger, an image overlay processor, a graphics processing unit, or a scaler.

7. The electronic apparatus as claimed in claim 1, wherein the senseor comprises at least one of a G-sensor, a camera, and a Gyro meter.

8. The electronic apparatus as claimed in claim 1, wherein the processor is a central processing unit, a graphics processing unit, a Tensor processing unit, a microcontroller unit, or a digital signal processing unit.

9. The electronic apparatus as claimed in claim 1, wherein the electronic apparatus is a mobile phone, a tablet, or an automotive display apparatus.

10. An electronic apparatus comprising:
- a display device comprising a display panel, receiving an image data, and displaying an image related to the image data on the display panel, wherein a reference image point of the image is displayed on a first location on the display panel;
- a sensor detecting a movement status of the electronic apparatus when the electronic apparatus shakes to generate at least one movement parameter; and
- a processor receiving the least one movement parameter and calculating compensation data according to the at least one movement parameter and size information of the display panel,
- wherein when the display device receives the compensation data, the display device displays the image by shifting the reference image point of the image from the first location to a second location on the display panel to according to the compensation data to maintain a user view direction toward to the reference image point of the image on the display panel, and
- wherein the display device further comprises:
- a controller receiving the image data, mapping a reference image element which is obtained from the image data to the first location, and generating display data according to the mapping wherein the reference image point of the image corresponds to the reference image element; and
- a data driver receiving the display data, generating image signals according to the display data, and providing the image signals to the display panel, and
- wherein when the controller receives the compensation data, the controller re-maps the reference image element of the image data to the second location instead of the first location according to the compensation data and modifies the display data according to the re-mapping, and the data driver generates the image signals according to the modified display data.

11. The electronic apparatus as claimed in claim 10, wherein the at least one movement parameter comprise a direction parameter and a distance parameter.

12. The electronic apparatus as claimed in claim 11, wherein the movement status comprises a movement speed and a movement direction of the electronic apparatus, and the sensor calculates a movement distance a period according to the movement speed and generates the direction parameter and the distance parameter according to the movement direction and the movement distance.

13. The electronic apparatus as claimed in claim 10, wherein the size information of the display panel comprises at least one of size of the display panel, resolution of the display panel, a distance between adjacent two pixels of the display panel, and the number of pixels per inch on the display panel.

14. The electronic apparatus as claimed in claim 10, wherein the display panel comprises a plurality of pixels arranged in an array, the controller further generates a timing control signal, and the display device further comprises:
- a timing controller controlled by the timing control signal to generate a first timing signal and a second timing signal; and
- a scan driver receiving the first timing signal and generating driving signals to the display panel according to the first timing signal to drive the plurality of pixels,
- wherein the data driver further receives the second timing signal, and providing the image signals to the driven pixels according to the second timing signal,
- wherein the display panel is controlled by the scan driver and the data driver to display the image,
- wherein when the controller receives the compensation data, the display panel displays the image by using the second location to display the reference image point of the image instead of the first location.

15. The electronic apparatus as claimed in claim 14, wherein the controller is an image composer, a Surface Flinger, an image overlay processor, a graphics processing unit, or a scaler.

16. The electronic apparatus as claimed in claim 10, wherein the senseor comprises at least one of a G—sensor, a camera, and a Gyro meter.

17. The electronic apparatus as claimed in claim 10, wherein the processor is a central processing unit, a graphics processing unit, a Tensor processing unit, a microcontroller unit, or a digital signal processing unit.

18. The electronic apparatus as claimed in claim 10, wherein the electronic apparatus is a mobile phone, a tablet, or an automotive display apparatus.

* * * * *